3,417,041
POLISH COMPOSITIONS CONTAINING A COPOLYMER OF VINYL TOLUENE AND ISOBUTYL METHACRYLATE
George L. Brown, Swampscott, and Harry Silverstein, Beverly, Mass., assignors to Polyvinyl Chemicals, Inc., Peabody, Mass., a corporation of Massachusetts
No Drawing. Filed Aug. 28, 1964, Ser. No. 392,946
4 Claims. (Cl. 260—28.5)

ABSTRACT OF THE DISCLOSURE

A film forming solution, for use in the formulation of polishing compositions, containing as a solvent an aliphatic naphthenic petroleum fraction containing about ten percent by weight of aromatic hydrocarbons and as the film forming agent a solution in the solvent of a copolymer of vinyl toluene and isobutyl methacrylate, and polishing compositions formulated from the film forming solution and further including a hydrocarbon soluble waxy material and a hydrocarbon soluble hydrocarbon resin.

---

Our invention relates to polymeric resin solutions and to polishing compositions made therefrom, and more particularly to novel solutions especially useful for applying a petroleum soluble polish film to wood flooring.

It is the object of our invention to facilitate the maintenance of a durable and attractive protective waxy polish coating on wood floors, with a minimum of labor and expense. A great many polishing compositions have been developed which dry to a bright shine without buffing. These compositions frequently consist of aqueous emulsions of waxy material, and are well suited for use on such substrates as linoleum or asphalt tile. So far as we are aware, however, prior to our invention, there has been no really satisfactory bright drying finish available for wood floors. Such polishing compositions as are available either require buffing to produce an acceptable gloss, are potentially damaging to wood floors, or present problems of removability. Specifically, certain polishing compositions dry to glossy films which cannot readily be removed by any means, tending to wear off irregularly to produce an unattractive appearance not readily restored. Prior solution polish systems, consisting of film forming materials dissolved in highly aliphatic petroleum solvents, produce films which may be removed with the petroleum solvent but which require buffing to produce an acceptable gloss. Bright drying polishing systems of the aqueous emulsion type forming films removable with water, or acid or alkaline solutions in water, have been developed; however, the application of water or aqueous polish removing solutions to a wooden floor results in damage to the floor, presumably because of the swelling and penetrating effect of water on wood. The polishing composition of our invention is capable of drying to a level film having a bright shine, the film being sufficiently durable to maintain its appearance over reasonable periods of time when subjected to wear, and being readily removable from a wood floor without damage to the floor. In addition to being removable, the films formed in accordance with our invention are renewable by reapplication. That is, a recoat can be applied without removal of preceding coats, the application process itself providing some cleaning by means of dirt dispersion and pickup by the applicator. Also, repair of a part of the floor subject to heavy wear or damage is possible, the new partial application blending into the previous coat.

Our invention is based on the discovery that hydrocarbon solutions of copolymers of isobutyl methacrylate and vinyl toluene have unique and surprising properties making them especially suitable for use in formulating polishing compositions for use on wood floors. Polishing compositions including these solutions, together with hydrocarbon-soluble film forming resins and waxes, dry to films which are hard, tough, durable, scuff resistant, and shine without buffing, but which can be readily removed with a high-aliphatic hydrocarbon solvent. Prior difficulties in formulating successful compositions of this type have resulted from the conflicting requirements that the polymeric resin constituent be soluble in the hydrocarbon solvent in relatively large amounts at relatively low temperatures, while at the same time imparting sufficient hardness and toughness to the film to give it desirable wearing properties. Numerous polymeric resins are available having adequte solubility in hydrocrbon solvents, but producing films entirely too soft for use in polishing compositions. Other polymeric resins are known which have adequate hardness, but which are insoluble in hydrocarbon solvents. Surprisingly, however, we have found that copolymers of isobutyl methacrylate and vinyl toluene are soluble in relatively large amounts in hydrocarbon solvents at temperatures as low as 0° Centigrade, and yet produce hard tough films ideally suited for use as polish film constituents. This behavior is quite unexpected, since polymers of isobutyl methacrylate alone, or of vinyl toluene alone, of similar molecular weights, do not have the essential solubility. The polymers of isobutyl methacrylate do not form clear solutions containing 20 percent resin in hydrocarbon solvents below 10° C., whereas the vinyl toluene polymers are essentially insoluble in hydrocarbon solvents at temperatures below 35° C. One might expect that styrene would be a suitable substitute for vinyl toluene in the compositions of my invention, as it is closely related chemically to vinyl toluene. However, we have found that copolymers of isobutyl methacrylate and styrene have lower solubility than isobutyl methacrylate homopolymers. Also, copolymers of vinyl toluene and n-butyl methacrylate are unsatisfactory, as they are too soft.

A polishing composition in accordance with our invention which is especially suitable for use on wood floors, or on metal or glass or other surfaces not affected by petroleum solvents, dries to a bright gloss without buffing, and yet is readily removable in hydrocarbon solvents when desired, comprises a polymeric resin solution of the type described above in which selected resins and waxes are dissolved to contribute desired properties to the resultant polish film. Specifically, the preferred polishing composition of our invention comprises from 5 to 25 percent by weight, and preferably from 10 to 20 percent by weight, of film forming solids dissolved in a hydrocarbon solvent, the solids consisting of from 50 to 85 percent by weight, preferably from 50 to 70 percent by weight, and more preferably of about 70 percent by weight, of a copolymer of isobutyl methacrylate and vinyl toluene, from 10 to 30 percent by weight, and preferably about 20 percent by weight, of petroleum resin selected in a manner known to those skilled in the art to impart water resistance, hardness, improved gloss, slip-resistance and improved leveling properties, and from 5 to 40 percent by weight, and preferably about 10 percent by weight, of a waxy material selected for its solubility in hydrocarbon solvents. The waxy material contributes resistance to scuffing and heelmarking, durability, and lubricity to the polish film.

The copolymer of isobutyl methacrylate and vinyl toluene is preferably made from 30 percent to 70 percent by weight of isobutyl methacrylate and the balance vinyl toluene. However, copolymers containing from 20 to 80 percent of isobutyl methacrylate are also useful in the practice of my invention.

Any of the resins derived from petroleum and coal tar having suitable solubility, such as the polyindene, polycumarone, cumarone-indene, terpene phenolic and modified terpene phenolic resins well known to those skilled in the art, may be employed. A siutable cumarone indene resin is Picco N–110½, a product of Pennsylvania Industrial Chemical Corporation, Picco Products Division, of Clairton, Pa. Suitable terpene phenolic resins are Durez 219 and Durez 225, products of the Durez Plastics Division of Hooker Chemical Corporation, in North Tonawanda, N.Y., and Shanco 320, Shanco 300 and Shanco 130, products of Shanco Plastics and Chemicals, Incorporated, of Tonawanda, N.Y. Another suitable resin is Pentalyn A, a product of Hercules Powder Co., Inc., of Wilmington, Del. Suitable resins typically have a molecular weight of from 1000 to 2000.

Any conventional waxy material having suitable solubility in mineral solvents and possessing appropriate physical properties to impart toughness, resistance to wear, scuffing and heel-marking, and lubricity to the polish film may be employed. In general, mixtures of various waxy materials are preferred. Such relatively hard and soluble waxy materials as the chlorinated paraffins and chlorinated naphthalenes, poly octadecyl vinyl ether, poly stearyl methacrylate, paraffin waxes melting in ranges such as 125–130, 130–135, and 145–150° F., and the like, may be used as the major constituent of the waxy component, although the chlorinated compounds should not be used as the sole constituent because of possible toxicity and because they tend to affect adversely the aging properties of the resultant film. However, when used in quantities up to about fifty percent by weight of the total waxy material, in combination with such waxy materials as poly octadecyl vinyl ether, poly stearyl methacrylate, or the like, excellent results may be obtained. Preferably, the chlorinated compounds contain about 70 percent chlorine by weight, as a lower degree of chlorination tends to produce an unduly soft film. Suitable chlorinated paraffins are Unichlor 70–B, a product of the Neville Chemical Co. of Pittsburgh, Pa. and Chlorowax 70S, a product of the Diamond Alkali Company of Cleveland, Ohio. A suitable chlorinated naphthalene is Halowax 1014, a product of the Chemicals & Dyestuffs Division of Hoppers Company, Inc., of Pittsburgh, Pa. Poly octadecyl vinyl ether is available as EDM Wax, a product of Dura Commodities Corporation of New York, N.Y., and as Hoechst Wax V, a product of the Hostawax Company of Mountainside, N.J. Santowax M, a product of the Monsanto Chemical Company of St. Louis, Mo., is a chlorinated biphenol suitable for use as a waxy constituent in the compositions of our invention. Softer waxy materials, such as myristic, stearic, lauric and palmitic acids may be mixed with the harder waxy materials, if so desired, to improve the lubricity of the polish film. Wax ES254, a product of the Commercial Solvents Corporation of Croton-on-Hudson, N.Y., is a relatively hard waxy material useful in quantities of 50 to 100 percent by weight of total waxy material. Other waxy materials which have limited solubility in hydrocarbon solvents, or which are not compatible with other constituents of the compositions of our invention in large quantities, may be included in small quantities. These latter waxy materials include the natural waxes such as beeswax, Japan Wax, carnauba wax, montan wax, and the like, and emulsifiable and non-emulsifiable polyethenes and the like.

The hydrocarbon solvent used in the composition of our invention may be any suitable conventional petroleum fraction, but is preferably an aliphatic naphthenic hydrocarbon fraction having a flash point of about 100 to 110° F. and containing about 10 percent by weight of aromatic hydrocarbons. Such a solvent is widely available as Varsol No. 3, a product of the Humble Oil & Refining Co. of Houston, Tex. The same solvent used in the solution may also be used as the remover for the polish film.

Our invention, and the manner in which it is best carried out, will best be understood by consideration of the following detailed examples. First, examples will be given showing the manner in which suitable copolymers may be prepared. Copolymers of the desired molecular weight range are preferably made by suspension polymerization, making use of suspending agents to keep the reactants suspended in separate bead form, controlled amounts of an initiator to determine the rate and extent of the reaction, and a chain transfer agent to control the final molecular weight of the copolymer to a selected low value without disturbing the rate of the reaction. The amounts of certain of the ingredients used in Examples 1 through 11 are given in Table I below in grams.

TABLE I

| Ex. | Function suspending agents | | Monomers | | Dodecyl mercaptan, (chain transfer agent) |
|---|---|---|---|---|---|
| | Acrysol A-1, (solution) | Sodium beta naphthalene sulfonate | Isobutyl methacrylate | Vinyl toluene | |
| 1 | 3.2 | | 282.0 | 0 | .56 |
| 2 | 3.2 | | 353.8 | 28.2 | .56 |
| 3 | 3.2 | | 225.6 | 56.4 | .56 |
| 4 | 3.2 | | 197.4 | 84.6 | .56 |
| 5 | 3.2 | | 169.2 | 112.8 | .56 |
| 6 | 2.0 | .3 | 141.0 | 141.0 | .28 |
| 7 | 2.0 | .3 | 112.8 | 169.2 | .28 |
| 8 | 1.6 | .3 | 84.6 | 197.2 | .28 |
| 9 | 1.6 | .3 | 56.4 | 225.6 | .28 |
| 10 | 1.6 | .3 | 28.2 | 253.6 | .28 |
| 11 | 2.0 | .3 | 0 | 282.0 | .28 |

In the above examples, Acrysol A–1 is a 25 percent by weight aqueous solution of polymethacrylic acid, used as a suspending agent. The suspending agents were charged to a 1000 millimeter three-necked flask fitted with a stirrer, together with 335 milliliters of deionized water. Agitation was begun. 1.68 grams of benzoyl peroxide, the initiator in the reaction, were dissolved in the monomers and added to the flask. The dodecyl mercaptan, a chain transfer agent, was then added to the flask and agitation was continued, the flask being heated to 80° C. and held at that temperature until hard beads were formed. The contents of the flask were then heated at 96° to 98° C. for two hours. The flask was then cooled to 35° C., and the beads formed in the reaction were discharged and washed with water to remove all water soluble contaminents. The beads were then dried. The ratio of isobutyl methacrylate to vinyl toluene, the Knoop Hardness No., and the solution viscosity in 20 percent by weight solutions in Varsol No. 3, of the copolymers formed in the manner described above as Examples 1 through 11( are given in Table II below.

TABLE II

| Example | Ratio, IBMA/VT | Solution viscosity (cps.), 20% solution in Varsol No. 3 | Knoop Hardness No. |
|---|---|---|---|
| 1 | 100/0 | 275 | 9.3 |
| 2 | 90/10 | 133 | 10.5 |
| 3 | 80/20 | 110 | 10.9 |
| 4 | 70/30 | 82 | 11.5 |
| 5 | 60/40 | 65 | 11.1 |
| 6 | 50/50 | 42 | 14.4 |
| 7 | 40/60 | 40 | 13.8 |
| 8 | 30/70 | 37 | 14.4 |
| 9 | 20/80 | 37 | 14.8 |
| 10 | 10/90 | 39 | 15.4 |
| 11 | 0/100 | insoluble | 16.1 |

To illustrate the solubility of copolymer solutions in accordance with our invention, 20 percent by weight solutions in Varsol No. 3 of the compositions in Examples 1 through 11 were made, and the light transmission of each solution was measured by a standard electrophotometer responding to light having a wave length of 425 millimicrons. The temperature at which each measurement was made, and the resultant electrophotometer reading, are given in Table III below. Where transmission readings are given in Table III, the solutions remained homogeneous, whereas for the other cases, separation into two layers, one rich in polymers and the other very dilute in polymers, occurred.

TABLE III

| Example | Ratio, IBMA/VT | Light transmission at stated temperature | | | | | | | |
|---|---|---|---|---|---|---|---|---|---|
| | | 0° | 5° | 10° | 15° | 20° | 25° | 30° | 35° |
| 1 | 100/0 | 1——separated——1 | | | 100 | 100 | 100 | 100 | 100 |
| 2 | 90/10 | 1——separated——1 | | | 89.6 | 92.0 | 93.2 | 95.0 | 96.0 |
| 3 | 80/20 | 1—separated—1 | | 94.4 | 96.9 | 97.0 | 97.5 | 98.0 | 99.4 |
| 4 | 70/30 | 85.2 | 88.0 | 93.5 | 93.0 | 95.0 | 95.6 | 96.1 | 97.0 |
| 5 | 60/40 | 89.0 | 91.0 | 93.0 | 93.5 | 94.7 | 95.2 | 96.7 | 97.0 |
| 6 | 50/50 | 92.3 | 93.7 | 96.1 | 96.0 | 96.7 | 97.5 | 98.5 | 98.0 |
| 7 | 40/60 | 90.2 | 93.0 | 99.5 | 99.5 | 97.3 | 97.5 | 97.5 | 96.0 |
| 8 | 30/70 | 1-sep.-1 | 89.0 | 94.7 | 94.6 | 93.6 | 93.9 | 93.0 | 93.9 |
| 9 | 20/80 | 1—separated—1 | | 72.2 | 82.5 | 89.5 | 90.5 | 92.0 | 92.5 |
| 10 | 10/90 | 1————separated————1 | | | | 61.0 | 86.0 | 92.0 | 94.5 |
| 11 | 0/100 | | | | 1————separated————1 | | | | |

Where indicated in Table III above, the solutions separated into layers at the temperatures given. At other temperatures, the light transmission is a measure of the tendency of the solution to cloud prior to separation. As indicated, all of the solutions of copolymers containing from 80 percent by weight of isobutyl methacrylate to 20 percent by weight of isobutyl methacrylate were essentially clear and stable down to 10° C. Solutions from 70 percent isobutyl methacrylate to 30 percent isobutyl methacrylate were stable at 5° C., and those solutions made from 70 percent to 40 percent isobutyl methacrylate were stable and clear down to 0° C. As indicated in Table II above, the hardness of films formed from all of these copolymers is well within the desired range of 9 to 16.

Polishing compositions suitable for use on wood flooring were prepared from copolymers in accordance with our invention, and contained the amounts of ingredients given in Table IV below, in grams, dissolved in each case in 900 grams of Varsol No. 3. In each of the formulations given as Examples 12 through 16 below, two batches were made up, one using the copolymer made from 60 percent by weight isobutyl methacrylate and 40 percent by weight vinyl toluene, and a second batch made from 30 percent by weight isobutyl methacrylate and 70 percent by weight vinyl toluene. The result in each case was a clear solution which, when spread on a wood floor and allowed to dry, resulted in a hard tough glossy film with good resistance to scuffing and with a relatively high coefficient of friction producing a secure footing. Conventional wear and use tests, including comparison tests on floor panels, were made and showed excellent performance.

TABLE IV

| Example | Amount of Copolymer | Waxy Material | Amount | Resin | Amount |
|---|---|---|---|---|---|
| 12 | 70 | Myristic Acid / Hoeschst Wax V | 5 / 5 | Picco N-110½ | 20 |
| 13 | 70 | Unichlor 70-B | 5 | Durez 225 | 20 |
| 14 | 70 | Myristic Acid / EDM Wax | 5 / 5 | Picco N-110½ | 20 |
| 15 | 60 | Myristic Acid / Hoeschst Wax V / Paraffin Wax¹ | 10 / 5 / 5 | Durez 225 | 20 |
| 16 | 50 | EDM Wax / Paraffin Wax¹ | 15 / 15 | Durez 225 | 20 |

¹ M.P., 130–135° F.

While we have described the compositions of my vention with respect to the details of various specific examples, many changes and variations will be apparent to those skilled in the art upon reading our description, and such may obviously be made without departing from the scope of our invention.

Having thus described our invention, what we claim is:

1. A polish composition consisting essentially of from 5 to 25 percent by weight of film forming solids dissolved in a hydrocarbon solvent, said solids consisting of from 5 to 40 percent by weight of a hydrocarbon soluble waxy material, from 10 to 30 percent by weight of a hydrocarbon soluble hydrocarbon resin, and from 50 to 85 percent by weight of a coplymer of monomers consisting of vinyl toluene and from 20 to 80 percent by weight of monomers of isobutyl methacrylate, said copolymer having an average molecular weight sufficient to form with the solids a bright, durable film upon evaporation of the solvent.

2. The composition of claim 1 in which said solvent contains about 90 percent by weight of aliphatic naphthenic constituents and about 10 percent by weight of aromatic constituents.

3. A polish composition, consisting of a solution stable at 5° C. of from 5 to 25 percent by weight of film forming solids dissolved in a hydrocarbon solvent, said solids consisting of from 5 to 40 percent by weight of hydrocarbon soluble waxy material, from 10 to 30 percent by weight of a hydrocarbon resin having a molecular weight from 1000 to 2000 and having the film forming properties of a cumerone-indene resin, and from 50 to 85 percent by weight of a copolymer of from 20 to 80 parts by weight of isobutyl methacrylate and from 80 to 20 parts by weight of vinyl toluene, said copolymer having an average molecular weight sufficient to form with the solids a bright, durable film upon evaporation of the solvent.

4. A polish composition, consisting of a solution in a hydrocarbon solvent of from 10 to 20 percent by weight of film forming solids, said solids consisting of from 10 to 30 parts by weight of hydrocarbon soluble hydrocarbon resin, from 5 to 30 parts by weight of hydrocarbon soluble waxy material, and from 50 to 70 parts by weight of a suspension copolymer of monomers consisting of vinyl toluene and from 30 to 70 percent by weight of monomers of isobutyl methacrylate.

References Cited

UNITED STATES PATENTS

| 2,232,595 | 2/1941 | Dittmar et al. | 260—28.5 |
| 2,514,427 | 7/1950 | Trimble | 260—28.5 |
| 2,536,349 | 1/1951 | Brush | 260—28.5 |
| 3,118,786 | 1/1964 | Katchman et al. | 260—86.7 |

FOREIGN PATENTS

| 880,356 | 10/1961 | Great Britain. |
| 1,308,346 | 9/1962 | France. |
| 957,440 | 5/1964 | Great Britain. |

(Other references on following page)

OTHER REFERENCES

Taylor et al.: Paint Technology Manuals, part two solvents, oils, resins and driers, 1961, Reinhold Publishing Corp., New York, pp. 232 and 233.

Strain et al.: Industrial and Engineering Chemistry, "Methacrylate Resins," vol. 31, No. 4, April 1939, pp. 382 to 387.

MORRIS LIEBMAN, *Primary Examiner.*

B. A. AMERNICK, *Assistant Examiner.*

U.S. Cl. X.R.

260—33.6, 86.7, 829, 901